H. B. HOLMES & E. B. CRAFT.
AUTOMATIC EXCHANGE SELECTOR.
APPLICATION FILED JUNE 4, 1906.
970,821.
Patented Sept. 20, 1910.
4 SHEETS—SHEET 3.
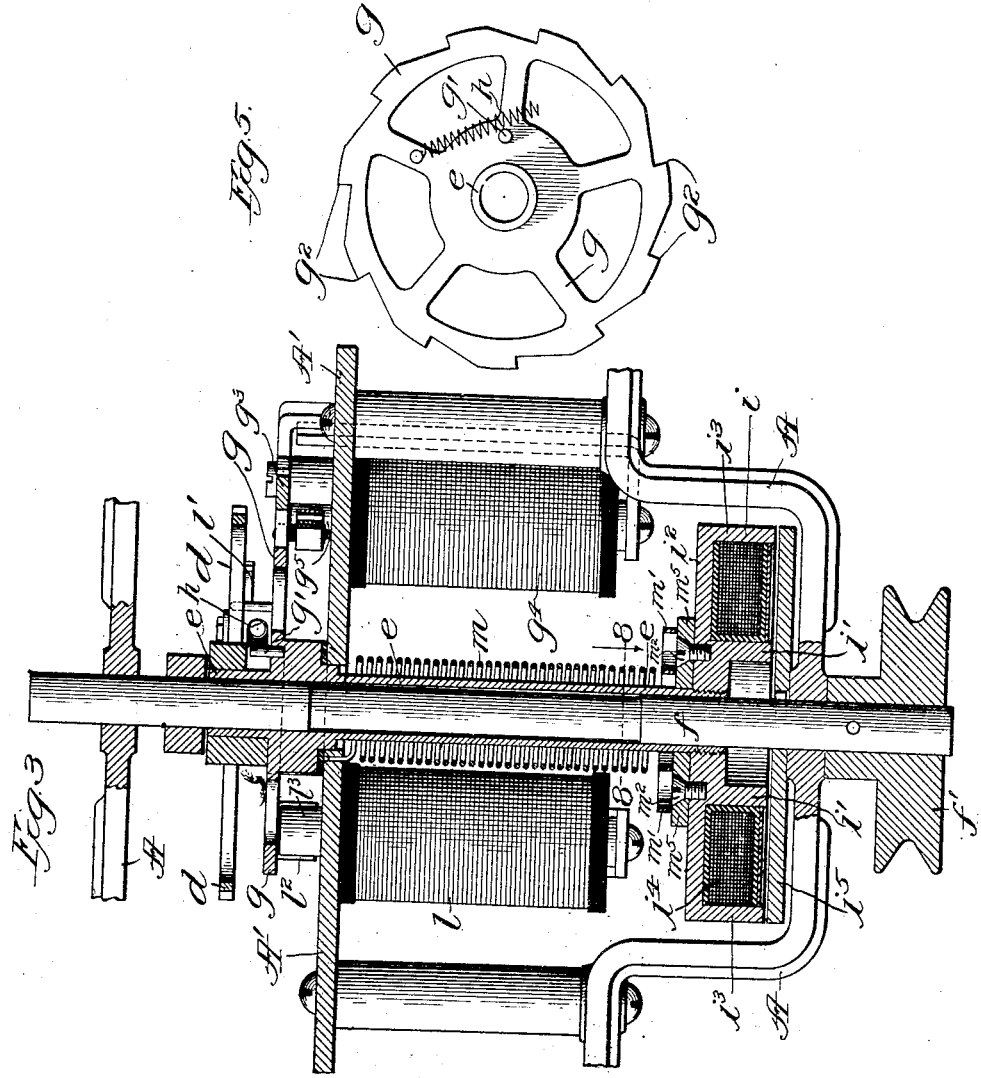
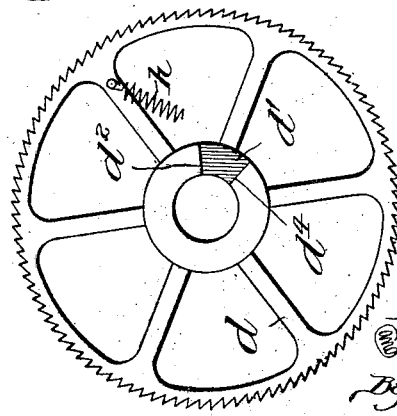

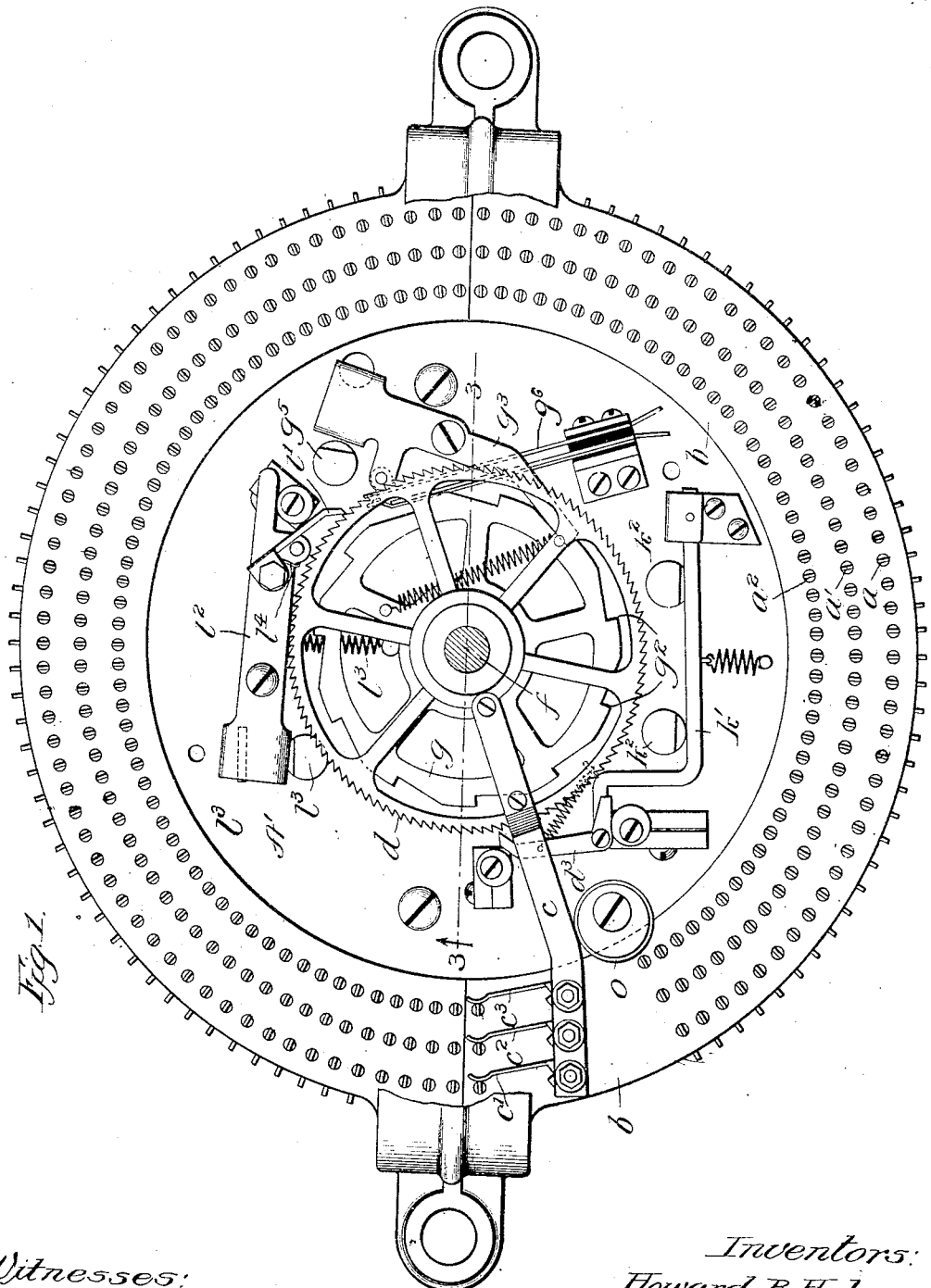

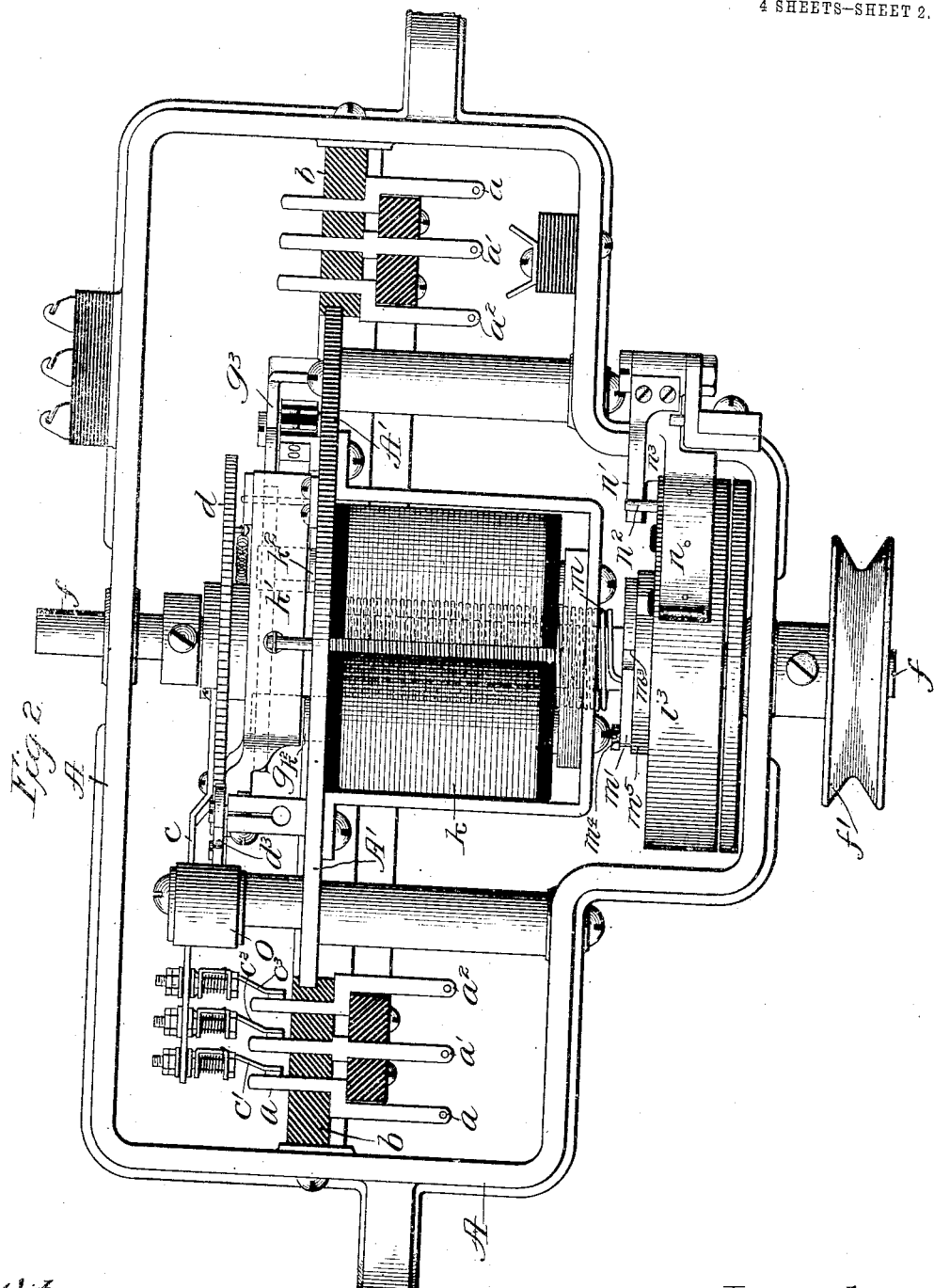

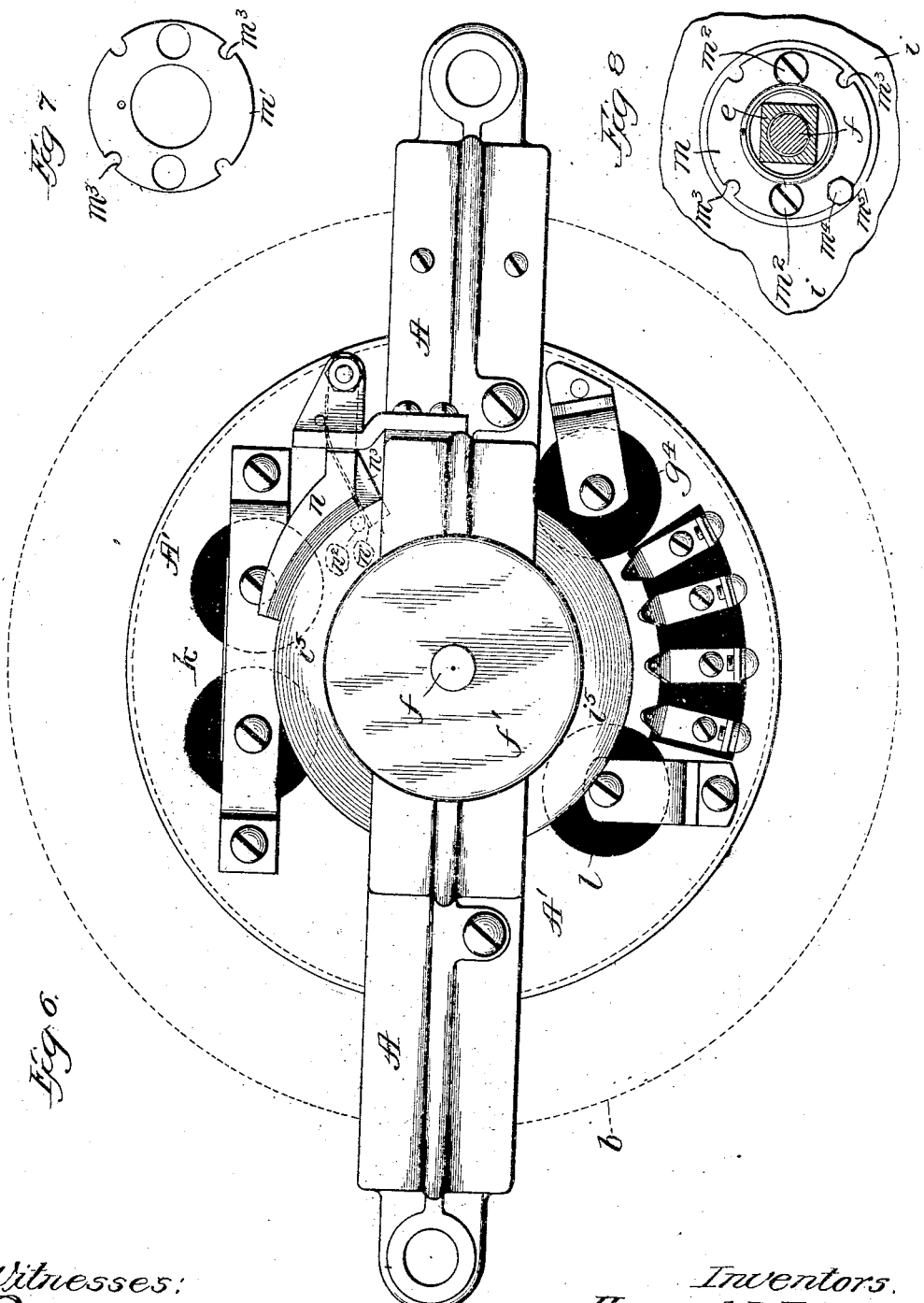

UNITED STATES PATENT OFFICE.

HOWARD B. HOLMES, OF PARK RIDGE, AND EDWARD B. CRAFT, OF WILMETTE, ILLINOIS, ASSIGNORS TO WESTERN ELECTRIC COMPANY, OF CHICAGO, ILLINOIS. A CORPORATION OF ILLINOIS.

AUTOMATIC EXCHANGE-SELECTOR.

970,821.   Specification of Letters Patent.   Patented Sept. 20, 1910.

Application filed June 4, 1906. Serial No. 320,035.

*To all whom it may concern:*

Be it known that we, HOWARD B. HOLMES and EDWARD B. CRAFT, citizens of the United States, residing at Park Ridge and Wilmette, respectively, in the county of Cook and State of Illinois, have invented a certain new and useful Improvement in Automatic Exchange-Selectors, of which the following is a full, clear, concise, and exact description.

Our invention relates to an automatic telephone exchange selector for effecting the interconnection of different lines terminating at the central exchange, and its object is to provide an improved and efficient device for accomplishing such interconnection with rapidity.

Our invention contemplates a selector carrying the terminals of the lines in the exchange and provided with a movable selector arm adapted to sweep over said terminals in long and short steps, respectively. A source of mechanical power is provided, such as a continuously rotating shaft, an electromagnetic clutch controlling the movement of said brush with the shaft in long steps over the terminals. Electromagnetic mechanism is arranged to step the brush in short steps over the terminals.

We will describe our invention more particularly by reference to the accompanying drawings, which represent the preferred embodiment thereof, reserving for the appended claims a statement of the parts, improvements and combinations which we deem novel with us.

In the drawings, Figure 1 is a plan view of a selector embodying our invention; Fig. 2 is a side elevation of the selector, partially in section; Fig. 3 is a vertical sectional view on line 3—3 of Fig. 1; Fig. 4 is a bottom view of the short-step ratchet; Fig. 5 is a detail plan view of the long-step ratchet; Fig. 6 is a bottom view of the selector; Fig. 7 is a detail plan view of the spring adjusting plate; and Fig. 8 is a plan sectional detail on line 8—8 of Fig. 3.

The same letters of reference are used to designate the same parts throughout the different figures.

The line terminals $a$, $a'$, $a^2$, of the lines are mounted upon an insulating ring or supporting plate $b$ secured to the selector frame A, a movable contact arm $c$ being provided in association with said terminals, carrying brushes $c'$, $c^2$, $c^3$, adapted to engage the terminals $a$, $a'$, $a^2$, respectively. The arm $c$ is carried by a ratchet $d$ loosely mounted upon a sleeve $e$ loosely mounted in turn upon a shaft $f$ journaled in the frame A of the selector, said shaft carrying a pulley $f'$ whereby it may be rotated. A ratchet $g$ is rigidly secured to said sleeve, said ratchet carrying a pin $g'$ adapted to ride in a slot $d'$ in the ratchet $d$, a spring $h$ connecting said ratchets $d$, $g$, to maintain the pin $g'$ against the wall $d^2$ of the slot $d'$ of ratchet $d$, so that when the ratchet $g$ is operated the pin $g'$ will advance the ratchet $d$ carrying the contact arm $c$.

An electromagnetic clutch $i$ controls the connection of the sleeve $e$ with the shaft $f$ to cause the same to rotate therewith and advance the contact arm $c$. The said clutch may comprise a magnet carried by the sleeve and having a core $i'$ through which shaft $f$ passes, said sleeve being secured to the core. The core $i'$ is connected with the pole piece $i^2$ of the magnet, which is provided with an annular flange $i^3$ overhanging the magnet helix $i^4$, the rim of said flange forming the polar face of said magnet. An armature $i^5$, preferably in the form of an annular disk, is splined to the shaft before the polar face of the magnet. Thus when the armature $i^5$ is attracted the sleeve $e$ is caused to rotate with the shaft $f$.

The ratchet $g$ is arranged to advance the selector arm $c$ in long steps over the line terminals, preferably 10 terminals at a step, and is provided with long teeth $g^2$ and a retaining pawl $g^3$ mounted upon the face plate A', said pawl being normally held by a suitable spring $g^6$ against the teeth $g^2$, an electromagnet $g^4$ being mounted on the rear of said plate with its pole $g^5$ projecting through said plate in position to act, when energized, upon said pawl, to remove the same from engagement with the teeth $g^2$. Thus on a hundred line exchange selector, such as illustrated, one hundred sets of terminals would be provided; the ratchet $g$ would have ten operating teeth and the ratchet $d$ one hundred operating teeth.

The ratchet $d$ is arranged to be operated independently of ratchet $g$ to advance the arm $c$ in short steps over the terminals, preferably from one set of terminals to the next. The ratchet $d$ is provided with a stepping pawl $d^3$ adapted to be operated by the armature $k'$ of an electromagnet $k$ mounted upon the rear of the face plate A', with its pole $k^2$ projecting through the plate in position to act upon armature $k'$ which is pivoted upon the front of said plate. When the ratchet $d$ is operated by pawl $d^3$, the pin $g'$ of ratchet $g$ rides in the slot $d'$ in ratchet $d$ without affecting the ratchet $g$ until the pin strikes the wall $d^4$ of slot $d'$. Thus if line 49 were desired, the tens ratchet would be operated to advance the contact arm $c$ in four long steps to the terminals of line 40, and the ratchet $d$ thereupon operated nine times to advance the arm to the terminals of line 49.

The ratchet $d$ is provided with a retaining pawl $l'$ carried by the armature $l^2$ of a magnet $l$ mounted upon the rear of the face plate A', the pole $l^3$ of said magnet projecting through said plate in position to act on said armature. A spring $l^4$ normally maintains the pawl $l'$ in engagement with said ratchet.

A spring $m$ is provided for moving the sleeve and ratchets to return the contact arm $c$ to normal position when the retaining pawls are withdrawn by their magnets from ratchets $d$, $g$. Said spring $m$ encircles the sleeve $e$, being connected at one end to the plate A' and at the other end to a torsion-adjusting disk $m'$ loosely mounted upon the sleeve $e$. Said disk is provided with a number of slots $m^3$ $m^3$, a set bolt $m^4$ being adapted when the disk is adjusted to pass through one of the several slots $m^3$ into the threaded hole in the plate $m^5$ which is in turn secured to the shell of the magnetic clutch by screws $m^2$ $m^2$.

A brake is provided for the sleeve $e$ adapted to be applied as the arm reaches its normal position, said brake preferably comprising a brake shoe $n$ pivoted to the frame A alongside the flange $i^3$ of the clutch, and carrying a spring $n'$ adapted as the contact arm $c$ approaches normal position to be engaged by a pin $n^2$ carried by the pole piece $i^2$ of the clutch, to gradually force said brake shoe against the flange $i^3$ of the clutch. With this arrangement, the arm $c$ is caused to come properly to rest against its stop $o$, and recoil prevented.

The operation of the selector shown is as follows:—The retaining pawls $l'$ and $g^3$ being normally in engagement with their respective ratchets, the electromagnetic clutch $i$ is excited intermittently a number of times corresponding to the number of long steps which it is desired to take, each excitation of the clutch being of a duration sufficient to insure the operative connection or coupling of the power shaft $f$ to the long step ratchet $g$ for such an interval of time that the ratchet will be advanced one tooth, or such clutch $i$ may be energized continuously for a length of time sufficient to cause the ratchet to be continuously advanced the required number of teeth. When the brush-carrier arm $c$ has thus been advanced the required number of long steps the clutch magnet $i$ is deënergized. The stepping magnet $k$ is then intermittently excited a number of times corresponding to the number of short steps which it is desired the brush carrier arm shall take. Each excitation of the stepping magnet $k$ causes the pawl $d^3$ to advance the short step ratchet $d$ one step, this further movement being independent of the long step ratchet $g$, which remains stationary. This further advance is against the tension of the spring $h$ connecting the two ratchets, said spring normally holding the short step ratchet $d$ at the rearward limit of its relative movement with respect to ratchet $g$, so that the first movement of the long step ratchet $g$ will cause the short step ratchet $d$ to move therewith, the two being then in fixed relation.

When the retaining magnets $l$ and $g^4$ are excited, the retaining pawls $l'$ and $g^3$ are withdrawn from engagement with their respective ratchets, whereupon the spring $h$ restores ratchet $d$ to its normal position relative to ratchet $g$, and spring $m$ returns both ratchets and the brush carrier arm $c$ to normal position.

We claim:

1. In a selector, the combination with stationary line terminals and a movable brush carrier having brushes which it is adapted to trail over said line terminals; a ratchet wheel moving with said brush carrier, electromagnetic stepping mechanism for advancing said ratchet wheel in short steps, a second ratchet wheel operatively connected to advance said brush carrier in long steps, said first mentioned ratchet being mounted to have an advance movement independent of the long step ratchet, means for limiting said independent advance movement and electromagnetic mechanism for advancing said long step ratchet.

2. In a selector, the combination with a movable brush carrier and a ratchet wheel for advancing the same in short steps, a second ratchet wheel mounted coaxially with the first ratchet and rotatable relatively thereto, a connection adapted to cause the first mentioned ratchet and brush carrier to be advanced by the advance movement of the second ratchet, said first ratchet being mounted to have a further advance movement independent of the second ratchet, a stop for limiting said independent advance movement, and separate electromagnetic stepping mechanisms for advancing the respective ratchets.

3. In an automatic telephone exchange, the combination with the line terminals, of a contact brush adapted to sweep over said terminals, a continuously rotating shaft, a ratchet loosely mounted on said shaft adapted to advance said brush, and electromagnetic mechanism for securing said ratchet to the shaft to rotate therewith.

4. In an automatic telephone exchange selector, the combination with stationary line terminals, of a contact brush adapted to sweep over said terminals, a continuously rotating shaft, a ratchet loosely mounted on said shaft adapted to advance said brush, an electromagnetically controlled retaining pawl for said ratchet, electromagnetic mechanism for causing said ratchet to rotate with said shaft, and mechanism adapted to restore said ratchet and brush.

5. In an automatic telephone exchange selector, the combination with the line terminals, of a contact brush adapted to sweep over said terminals, a continuously rotating shaft, a sleeve loosely mounted on said shaft, adapted to effect the advance of said brush over said terminals, and a magnetic clutch adapted to cause said sleeve to rotate with said shaft.

6. In an automatic telephone exchange selector, the combination with the line terminals, of a contact brush therefor, a continuously rotating shaft, a sleeve loosely mounted on said shaft adapted to advance said brush over said terminals, a magnet carried by said sleeve, and an armature therefor splined to rotate with said shaft; whereby when said armature is attracted the sleeve is caused to rotate with said shaft.

7. In an automatic telephone exchange selector, the combination with the line terminals, of a contact brush therefor, mechanical means for advancing said brush in long steps over said terminals, an electromagnetic clutch controlling said means, and electromagnetic mechanism adapted to advance said brush in short steps.

8. In an automatic telephone exchange selector, the combination with line terminals, of a contact brush therefor, a continuously rotating shaft, a magnetic clutch for causing said brush to move with said shaft in long steps over said terminals, and electromagnetically operated mechanism for advancing said brush in short steps over said terminals.

9. In an automatic telephone exchange selector, the combination with the line terminals, of a contact brush therefor, a continuously rotating shaft, a ratchet wheel loosely mounted thereon adapted to step said brush in long steps over said terminals, a magnetic clutch for causing said ratchet to rotate with said shaft, and an electromagnetically operated ratchet wheel for advancing said brush in short steps over said terminals.

10. In a selector, the combination with stationary terminals and a movable brush carrier having brushes adapted to trail over said terminals, a short step ratchet adapted to advance said brush carrier, a long step ratchet adapted to advance the first mentioned ratchet and the brush carrier in long steps, said short step ratchet also having an advance movement independent of the advance of said long step ratchet, independent means for retaining the respective ratchets in their advanced positions, an electromagnet, a stepping pawl actuated thereby for advancing the short step ratchet, a rotating power shaft, and an electromagnetic clutch adapted to couple said power shaft to said long step ratchet, substantially as set forth.

11. In an automatic telephone exchange selector, the combination with the line terminals, of a contact brush therefor, a short step ratchet carrying said brush, a long step ratchet, a pin carried thereby riding in a slot in said short step ratchet, means for operating said long step ratchet to cause said pin to advance said other ratchet and brush in long steps, and step by step means for independently operating said short step ratchet, said pin riding in said slot without affecting said long step ratchet.

12. In an automatic telephone exchange selector, the combination with the line terminals, of a contact brush therefor, a continuously rotating shaft, a sleeve loosely mounted thereon, a long step ratchet carried on said sleeve, a pin carried by said ratchet, a short step ratchet loosely mounted on said sleeve and having a slot therein in which said pin rides, said ratchet carrying said contact brush, a magnetic clutch for connecting said sleeve to said shaft to rotate therewith and operate said long step ratchet, said ratchet causing said pin to move the other ratchet and brush in long steps, and electromagnetic mechanism for independently operating said short step ratchet, said pin riding in said slot without affecting said long step ratchet.

13. In an automatic telephone exchange selector, the combination with the line terminals, of a contact brush therefor, a ratchet for advancing said brush in long steps over said terminals, a continuously rotating shaft, a clutch for connecting said ratchet with said shaft to rotate therewith, an electromagnetically operated ratchet for advancing said brush in short steps over said terminals, electromagnetically operated retaining pawls for said ratchets, and mechanism for restoring said ratchets and brush to normal position.

14. In an automatic telephone exchange selector, the combination with the line terminals, of a movable contact brush therefor, a continuously rotating shaft, and an electromagnetic clutch controlling the connection of said brush with said shaft, said clutch comprising an electromagnet connected with said brush and having a pole piece provided with an annular flange overhanging the magnet helix, and an armature splined to said shaft before said flange.

15. In an automatic telephone exchange selector, the combination with the line terminals, of a movable contact brush therefor, a continuously rotating shaft, a sleeve loosely mounted on said shaft adapted when rotated to effect the movement of said brush, and an electromagnetic clutch controlling the connection of said sleeve with said shaft, said clutch comprising a magnet having a core secured to said sleeve, a pole piece secured to said core and having an annular flange overhanging the magnet helix, and an annular armature splined to the shaft before the polar face formed by the rim of said flange.

16. In an automatic telephone exchange selector, the combination with the line terminals, of a movable contact brush therefor, mechanical means for advancing said brush over said terminals, an electromagnetic clutch controlling said means, means for restoring said brush, and a brake therefor operated as said arm reaches its normal position.

17. In an automatic telephone exchange selector, the combination with the line terminals, of a movable contact brush therefor, a continuously rotating shaft, a ratchet loosely mounted on said shaft for moving said brush over said terminals, an electromagnetic clutch for connecting said ratchet with the shaft to move therewith, one member of said clutch being connected to said ratchet, and the other member being secured to said shaft, an electromagnetically controlled retaining pawl for said ratchet, means for restoring said ratchet and brush to normal position, and a brake for the first mentioned clutch member set as said brush and ratchet reach normal position.

18. In an automatic telephone exchange selector, the combination with the line terminals, of a movable contact brush therefor, a continuously rotating shaft, a sleeve loosely mounted on said shaft, a ratchet carried by said sleeve, a second ratchet carrying said brush loosely mounted on said sleeve and adapted to be moved by said first mentioned ratchet, an electromagnetic clutch for connecting said sleeve with said shaft, said clutch comprising a magnet secured to said sleeve and having a pole piece provided with an annular flange overhanging the magnet helix, and an armature splined to said shaft before said flange, said clutch when operated moving said first mentioned ratchet to advance the brush in long steps, means for independently operating the second mentioned ratchet to advance the brush in short steps, electromagnetically controlled retaining pawls for said ratchets, a spring for moving the sleeve to restore said ratchets and brush, a brake shoe for the annular flange of said clutch member, a pin carried by said pole adapted as the brush reaches normal position to engage a portion of said brake and clamp it against said flange.

In witness whereof, we hereunto subscribe our names this 31st day of May A. D., 1906.

HOWARD B. HOLMES.
EDWARD B. CRAFT.

Witnesses:
 ROY. T. ALLOWAY,
 CLARENCE A. COGGIN.